United States Patent
Miller

(10) Patent No.: US 10,279,614 B2
(45) Date of Patent: May 7, 2019

(54) ADJUSTABLE GLOSS LEVEL FOR PRINTING

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/287,572

(22) Filed: Oct. 6, 2016

(65) Prior Publication Data

US 2017/0120650 A1    May 4, 2017

Related U.S. Application Data

(60) Provisional application No. 62/248,532, filed on Oct. 30, 2015, provisional application No. 62/248,559, filed on Oct. 30, 2015.

(51) Int. Cl.
| | |
|---|---|
| B41J 29/38 | (2006.01) |
| B41M 5/00 | (2006.01) |
| A43B 3/00 | (2006.01) |
| B41J 11/00 | (2006.01) |
| B33Y 10/00 | (2015.01) |
| B29C 64/112 | (2017.01) |
| B41M 7/00 | (2006.01) |

(52) U.S. Cl.
CPC ......... *B41M 5/0011* (2013.01); *A43B 3/0084* (2013.01); *B29C 64/112* (2017.08); *B33Y 10/00* (2014.12); *B41J 11/002* (2013.01); *B41M 7/0081* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,056,559 | B2* | 6/2006 | Nakajima | B41J 11/002 |
| | | | | 106/31.58 |
| 8,424,993 | B2* | 4/2013 | Ikehata | B41J 2/2114 |
| | | | | 347/101 |
| 8,944,583 | B2* | 2/2015 | Waschnig | B41M 7/0081 |
| | | | | 347/102 |
| 2004/0069182 | A1* | 4/2004 | Nakajima | C09D 11/101 |
| | | | | 106/31.13 |

(Continued)

FOREIGN PATENT DOCUMENTS

| | | | | |
|---|---|---|---|---|
| CN | 1484584 A | 3/2004 | | |
| GB | 2470067 A | * 11/2010 | ......... | B41M 7/0081 |

(Continued)

OTHER PUBLICATIONS

International Search Report, dated Jan. 20, 2017, in corresponding International Patent Application No. PCT/US2016/055985, 6pp.

(Continued)

*Primary Examiner* — Matthew Luu
*Assistant Examiner* — Lily Kemathe
(74) *Attorney, Agent, or Firm* — Klarquist Sparkman, LLP

(57) ABSTRACT

A method and apparatus of providing varying gloss levels for a printed surface of a two-dimensional or three-dimensional printed structure is disclosed. The method includes dynamically adjusting the spacing between a printhead assembly and a curing device according to a target gloss level for the resulting printed structure.

14 Claims, 16 Drawing Sheets

(56) References Cited

U.S. PATENT DOCUMENTS

| | | | |
|---|---|---|---|
| 2004/0141040 A1* | 7/2004 | Nakajima | B41J 11/002 347/102 |
| 2004/0227798 A1* | 11/2004 | Nakajima | C09D 11/101 347/100 |
| 2006/0227194 A1 | 10/2006 | Hoshino | |
| 2007/0046719 A1 | 3/2007 | Yamanobe | |
| 2007/0256778 A1* | 11/2007 | Fusco | B41M 1/12 156/230 |
| 2009/0034998 A1* | 2/2009 | Omata | G03G 15/657 399/45 |
| 2009/0225143 A1 | 9/2009 | Fukui | |
| 2009/0244230 A1 | 10/2009 | Ohnishi | |
| 2010/0154244 A1* | 6/2010 | Kuta | F26B 3/28 34/275 |
| 2011/0157272 A1* | 6/2011 | Ikehata | B41J 2/2114 347/16 |
| 2012/0293575 A1* | 11/2012 | Shimada | B41J 11/002 347/9 |
| 2014/0020191 A1 | 1/2014 | Jones et al. | |
| 2014/0340456 A1* | 11/2014 | Waschnig | B41M 7/0081 347/102 |
| 2015/0231897 A1* | 8/2015 | Noell | B41J 3/4073 347/102 |
| 2015/0375530 A1* | 12/2015 | Andrea-Tallada | B41J 11/002 347/102 |

FOREIGN PATENT DOCUMENTS

| | | |
|---|---|---|
| JP | 2005 313558 | 11/2005 |
| JP | 2010-005934 A | 11/2005 |
| JP | 2013-188962 A | 1/2010 |
| JP | 2013188962 A | 9/2013 |
| WO | WO2002/053383 | 7/2002 |
| WO | WO/02053383 | 7/2002 |
| WO | WO2013/056292 | 4/2013 |

OTHER PUBLICATIONS

Office Action, dated Oct. 18, 2017, for corresponding Taiwan Patent Application No. 105133941, 16 pages, with English-language translation.

Office Action, dated Nov. 17, 2017, in corresponding Taiwanese Patent Application No. 105133861, 23 pages, with English translation.

International Search Report and Written Opinion dated Jan. 17, 2017, issued by the European Patent Office in Patent Cooperation Treaty Application No. PCT/US2016/055973, 14 pages.

Office Action issued in Taiwanese Patent Application No. 105133861, dated Nov. 21, 2017, with English translation (23 pages).

* cited by examiner

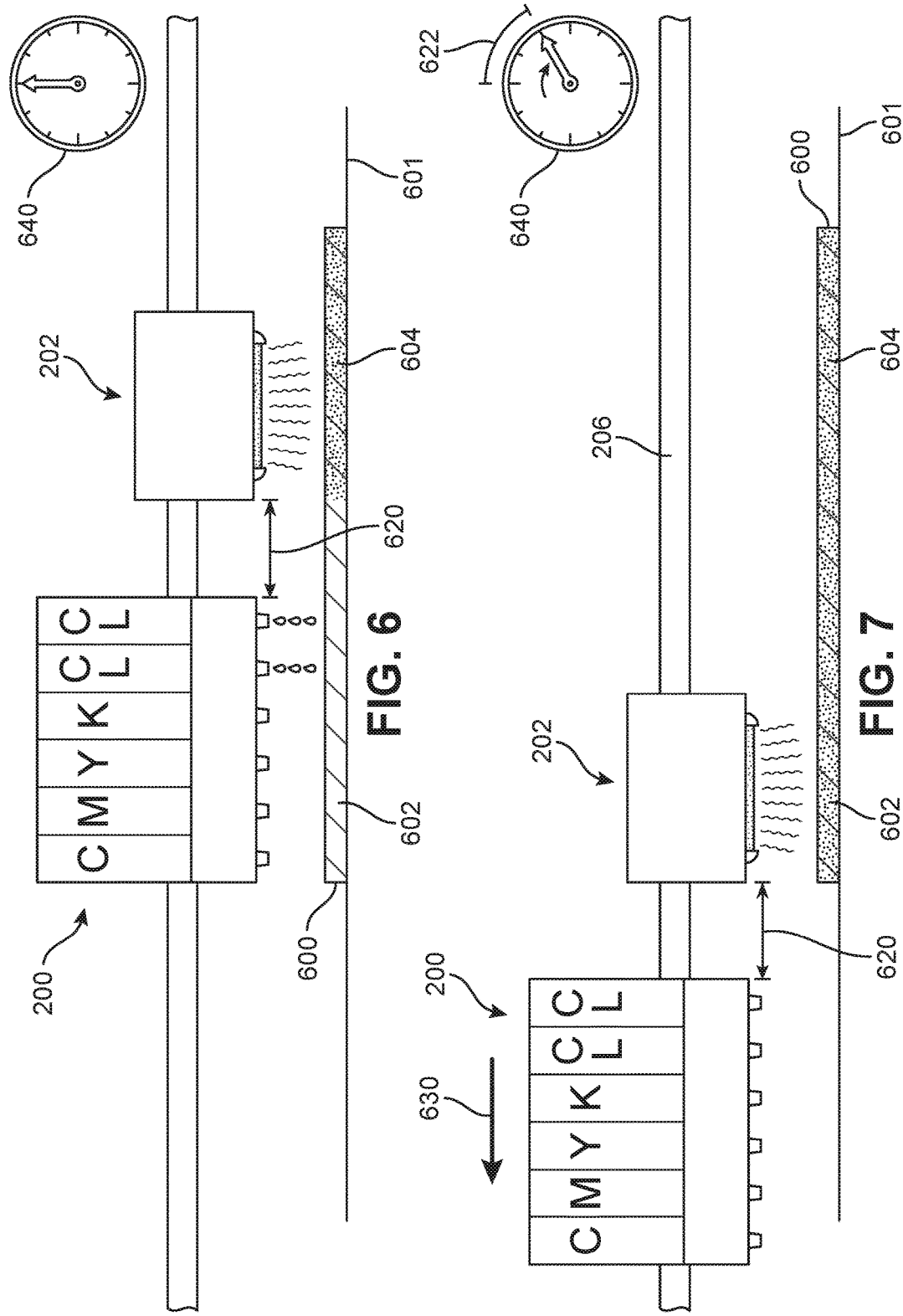

ADJUSTABLE GLOSS LEVEL FOR PRINTING

CROSS-REFERENCE TO RELATED APPLICATIONS

This application claims priority to U.S. Provisional Patent Application 62/248,532, filed Oct. 30, 2015, and titled "Adjustable Gloss Level for Printing", the entirety of which is herein incorporated by reference. This application further claims priority to Miller, U.S. Provisional Application No. 62/248,559 filed on Oct. 30, 2015, titled "Adjustable Gloss Level for Compact Printhead Arrangement", the entirety of which is herein incorporated by reference.

BACKGROUND

The present embodiments relate generally printing, including three-dimensional printing systems and methods.

Printing systems can be used to print 2D structures or layers of ink as well as 3D structures formed from various kinds of 3D printing materials. Three-dimensional printing systems and methods may be associated with various technologies including fused deposition modeling (FDM), electron beam freeform fabrication (EBF), selective laser sintering (SLS) as well as other kinds of three-dimensional printing technologies.

Structures formed from three-dimensional printing systems can be used with objects formed by other manufacturing techniques. These include textile materials used in various articles of footwear and/or articles of apparel.

When printing in 2D and/or 3D, the resulting outer surface of a printed element (i.e., the surface of an ink layer or a surface of a 3D printed structure) may have various kinds of finishes. One possible kind of finish is a gloss level, which can range from, for example, matte to high gloss.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIGS. 6-7 are side schematic views of a printhead assembly spaced apart from a curing device, intended to illustrate the relation between the spacing between the printhead assembly and the curing device and the time elapsed between when the print material is dispensed to a substrate and when the print material is cured, according to an embodiment;

DETAILED DESCRIPTION

The embodiments include methods and an apparatus for printing and curing a 2D or 3D structure with target (i.e., predetermined) gloss levels in various regions. The gloss levels of various regions of the structure can be varied by changing the separation distance between a printhead assembly and between a curing device of a printing system. The printhead assembly and the curing device are moved along tracks or rails of a printing device. The type of gloss level achieved may be increased (i.e., moved from matte to more glossy) by increasing the separation distance between the printhead assembly and the curing device. Some systems include provisions so that the printhead assembly and the curing device are separately controlled (i.e., actuated), and therefore their relative spacing along a track or rail can be automatically adjusted dynamically without the need for manual changes during or between print jobs.

Other systems, methods, features, and advantages of the embodiments will be, or will become, apparent to one of ordinary skill in the art upon examination of the following figures and detailed description. It is intended that all such additional systems, methods, features, and advantages be included within this description, be within the scope of the embodiments, and be protected by the following claims.

Figure 1:
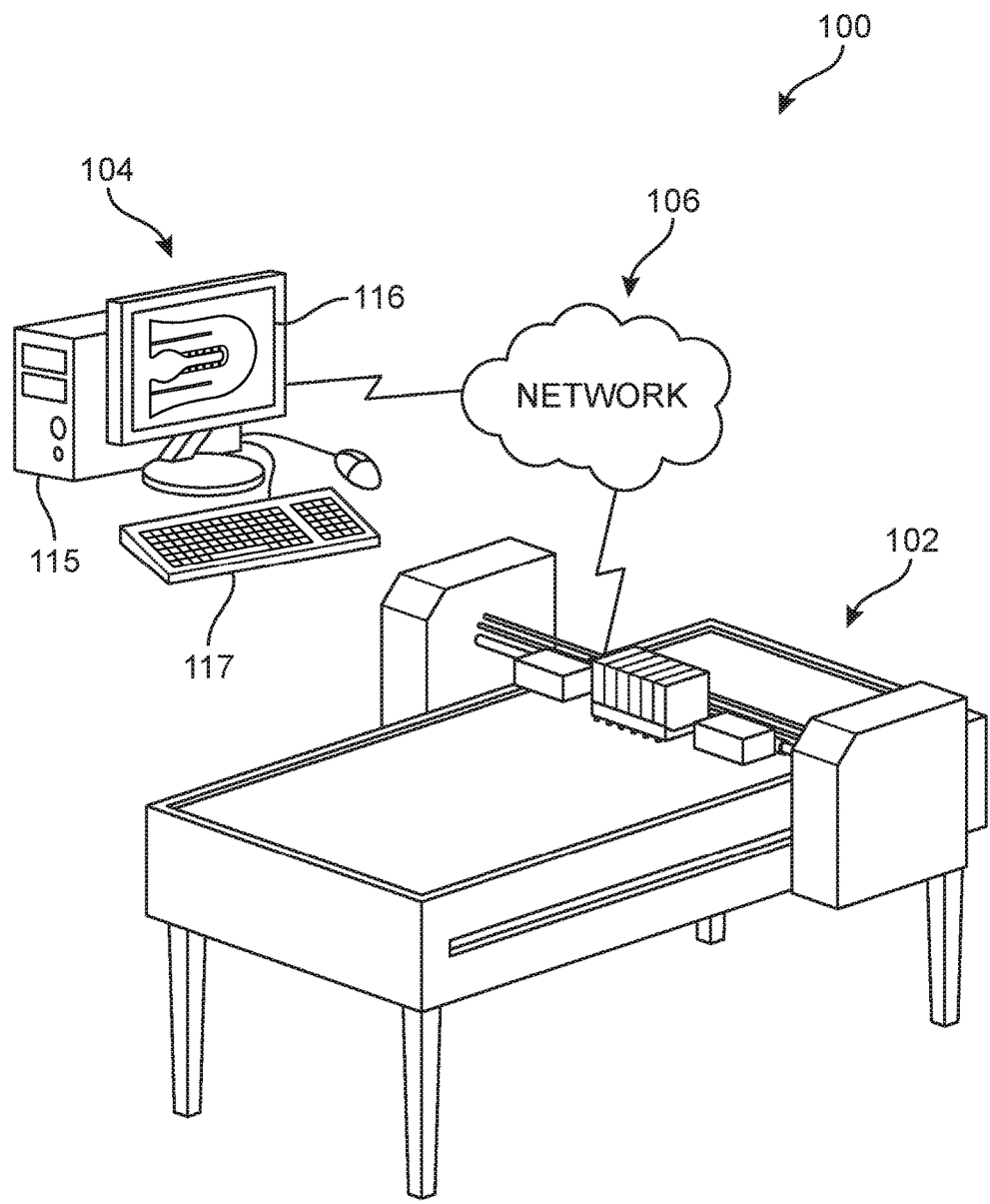
FIG. 1 is a schematic view of an embodiment of a printing system.

FIG. 1 is a schematic view of an embodiment of three-dimensional printing system 100, also referred to simply as printing system 100. Some embodiments of the printing system can include provisions that distribute one or more functions among different devices of the printing system. As shown, printing system 100 may include printing device 102, computing system 104, and network 106. In other embodiments, the printing system may be a single device or component (not shown).

As used herein, the terms "printer," "plotter," "three-dimensional printer," "three-dimensional printing system," or "three-dimensional printing system" may refer to any type of system that can print multiple layers onto a substrate, a fabric, an article of footwear, an article of apparel, or other article. In one embodiment, printing device 102 could be a sign and graphics printer.

Printing system 100 may utilize various types of printing techniques. These can include, but are not limited to, toner-based printing, liquid inkjet printing, solid ink printing, dye-sublimation printing, inkless printing (including thermal printing and UV printing), MicroElectroMechanical Systems (MEMS) jet printing technologies as well as any other methods of printing.

Some embodiments may use additive manufacturing techniques or three-dimensional printing techniques. Three-dimensional printing, or "3D printing," comprises various technologies that may be used to form three-dimensional objects by depositing successive layers of material on top of one another. Exemplary 3D printing technologies that could be used include, but are not limited to, fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP) as well as various other kinds of 3D printing or additive manufacturing technologies known in the art. Structures formed from three-dimensional printing systems can be used with objects formed by other manufacturing techniques. These include textile materials used in various articles of footwear, articles of apparel, and/or protective articles.

Some of the exemplary embodiments depict printing three-dimensional structures onto an article (e.g., an upper for footwear); however, other embodiments may utilize the principles discussed herein for printing and curing print material for any application. In some other embodiments, for example, the principles discussed herein could be used to print and cure thin films or layers of print material, such as may be used in printing a graphic or indicia onto a substrate. As used in this detailed description and in the claims, the term "printable feature" refers to any layer, portion or structure formed by printing (e.g., ejection from a nozzle). In some cases, a printable feature may be one or more layers of ink, as may be deposited by a conventional inkjet printer. In other cases, a printable feature could be a 3D structural feature that has been printed onto a substrate using a structural print material, such as thermoplastic materials.

In some cases, printing system 100 may make use of a combination of two or more different printing techniques. For example, in some embodiments, coloring inks may be printed as thin layers while clear or opaque print materials may be printed to form structural layers of a printed object or form. The type of printing technique used may vary according to factors including, but not limited to, material of the target article, size, and/or geometry of the target article, desired properties of the printed image (such as durability, color, ink density, etc.) as well as printing speed, printing costs, and maintenance requirements.

Additive manufacturing processes may be used to form structures on flat receiving surfaces as well as on contoured or non-flat surfaces. For example, some embodiments depicted in the figures may illustrate methods whereby material is printed onto a flattened surface of an article, such as a material section of an upper that has a flat or unassembled configuration. In such cases, printing material onto the surface may be accomplished by depositing material in thin layers that are also flat. Thus, a printhead or nozzle may move in one or more horizontal directions to apply an Nth layer of material and then move in the vertical direction to begin forming the N+1 layer. However, it should be understood that in other embodiments material could be printed onto a contoured or non-flat surface. For example, material could be printed onto a three-dimensional last, where the surface of the last is not flat. In such cases, the printed layers applied to the surface may also be contoured. In order to accomplish this method of printing, a printhead or nozzle may be configured to move along a contoured surface and tilt, rotate, or otherwise move so that the printhead or nozzle is always aligned approximately normal to the surface where printed material is being applied. In some cases, a printhead could be mounted to a robotic arm, such as an articulated robotic arm with six degrees of freedom. Alternatively, in still other embodiments, an object with a contoured surface could be reoriented under a nozzle so that contoured layers of printed material could be applied to the object. For example, embodiments could make use of any of the systems, features, components, and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components, and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

Generally, embodiments could apply any kind of print material to a substrate. As used herein, the term "print material" or "printable material" refers to any material that can be printed, ejected, emitted, or otherwise deposited during an additive manufacturing process. Exemplary print materials include inks as well as resins, plastics, or other print materials associated with 2D and/or 3D printing. In some embodiments, the materials used in the printing technology could be any aqueous ink, dye-based ink, pigment-based ink, solvent-based ink, dye-sublimation ink, thermoplastics e.g., PLA and ABS) and thermoplastic powders, acrylic resin, polyurethane, thermoplastic polyurethane, silicone, or any other curable substance. Still further examples of materials include high-density polyethylene, eutectic metals, rubber, modeling clay, plasticine, RTV silicone, porcelain, metal clay, ceramic materials, plaster, and photopolymers, as well as possibly other materials known for use in 3D printing.

In some embodiments, a print material may be any material that is substantially moldable and/or pliable above a predetermined temperature, such as a glass-transition temperature and/or a melting temperature. In one embodiment, a print material has one or more thermal properties such as a glass-liquid transition ("glass transition") temperature and/or a melting temperature. For example, the print material may be a thermoplastic material having a glass-transition temperature and a melting temperature. As used herein, thermoplastic materials may include, for example, acrylic, nylon, polybenzimidazole, polyethylene, polypropylene, polystyrene, polyvinyl chloride, polytetrafluoroethylene (PTFE), and the like.

In some embodiments, a print material may be UV curable. Generally, any appropriate type of UV-curable print material, including acrylic resin, polyurethane, TPU, silicone, or any other appropriate print material could be used.

Some embodiments of the printing system can include provisions that permit printed structures to be printed directly onto one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used herein, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of articles of footwear, various embodiments may further be equally applied to any article of clothing, apparel, or equipment that includes three-dimensional printing. For example, various embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used herein, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

In order to apply printed materials directly to one or more articles, printing device 102 may be capable of printing onto the surfaces of various kinds of materials. Specifically, in some cases, printing device 102 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material, or ink material onto a fabric, for example, a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam.

In some embodiments, printing system 100 can include provisions that control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some embodiments, a print server may be primarily responsible for controlling and/or communicating with printing device 102, while a separate computer (e.g., desktop, laptop or tablet) may facilitate interactions with a user. Computing system 104 can also include one or more storage devices including, but not limited to, magnetic, optical, magneto-optical, and/or memory, including volatile memory and non-volatile memory.

In those instances where a computing system is used, any suitable hardware or hardware systems may be used to facilitate provisions that control and/or receive information from printing device 102. In some embodiments, where a computing system is used, computing system 104 may include central processing device 115, viewing interface 116 (e.g., a monitor or screen), input devices 117 (e.g., keyboard and mouse), and software for designing a computer-aided design representation of a printed structure. However, in other embodiments, other forms of hardware systems may be used.

In those instances where software for designing a computer-aided design representation of a printed structure is used, any suitable information may be used to facilitate provisions for designing a computer-aided design representation of a printed structure. In at least some embodiments, the computer-aided design representation of a printed layer and/or printed structure may include not only information about the geometry of the structure, but also information related to the materials required to print various portions of the structure. However, in other embodiments, different information may be used.

In those instances where software for designing a computer-aided design representation of a printed structure is used, any suitable design structure may be used to transform the design into information that can be interpreted by printing device 102 (or a related print server in communication with printing device 102). In some embodiments, printing system 100 may be operated as follows to provide one or more structures that have been formed using a three-dimensional printing, or additive process. Computing system 104 may be used to design a structure. This may be accomplished using some type of CAD software, or other kind of software. The design may then be transformed into information that can be interpreted by printing device 102 (or a related print server in communication with printing device 102). In some embodiments, the design may be converted to a three-dimensional printable file, such as a stereolithography file (STL file); in other cases, the design may be converted into a different design structure. In still other embodiments, information about a structure to be printed may be sent in the form of an image file in which case image information (colors, hues, shades, transparency, etc.) of different regions can be used to determine a corresponding 3D structure.

In those instances where a network is used, network 106 may use any wired or wireless provisions that facilitate the exchange of information between computing system 104 and printing device 102. In some embodiments, network 106 may further include various components such as network interface controllers; repeaters, hubs, bridges, switches, routers, modems, and firewalls. In some embodiments, network 106 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

As discussed, a printing system may distribute various functionality across one or more devices or systems. In those instances where the printing system includes provisions that distribute one or more functions among different devices of printing system 100, any suitable protocol, format, and method may be used to facilitate communication among the devices of printing system 100. In some embodiments, these communications are conducted using network 106, in other cases, these communications may be conducted directly between devices of printing system 100.

Figure 2:
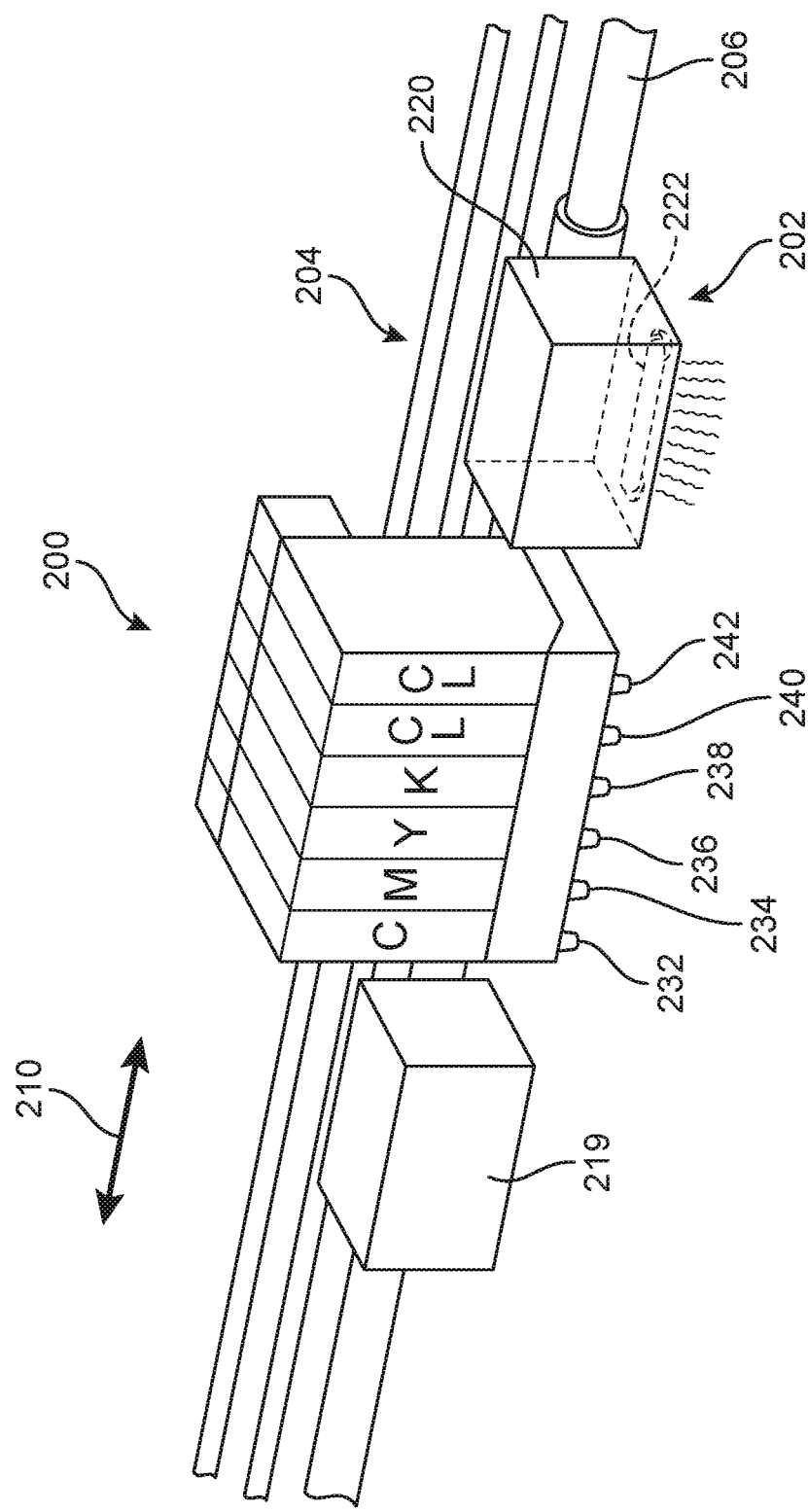
FIG. 2 is a schematic view of an embodiment of a printhead assembly and a curing device.

FIG. 2 illustrates a schematic view of an enlarged portion of some components of printing device 102 (see FIG. 1). Specifically, FIG. 2 shows a print head assembly 200 as well as curing device 202. In the embodiment of FIG. 2, print head assembly 200 and curing device 202 are further mounted to actuating system 204. In some cases, actuating system 204 may include various provisions for facilitating the movement of print head assembly 200 and/or curing device 202. In one embodiment, actuating system 204 includes one or more rails 206. Print head assembly 200 and curing device 202 could be mounted to rails 206 using one or more actuating devices, which allow print head assembly 200 and curing device 202 to be attached to, and transported along, rails 206 (i.e., in directions aligned with longitudinal axis 210 of print device 102).

In at least some embodiments, a printing device may include two separate curing devices disposed on opposing sides of a printhead. Such a configuration allows for a curing device to trail 'behind' a printhead regardless of the motion of direction of the printhead (i.e., left or right along axis 213). In the embodiment of FIGS. 1-2, a second curing device is shown (curing device 219 in FIG. 2). However, for purposes of illustration, curing device 219 is omitted from the remaining figures since the operation of this second curing device may be the same as the operation of curing device 202.

For purposes of clarity, the actuating devices that control the motion of print head assembly 200 and curing device 202 are not shown in FIG. 2. However, it may be understood that any known systems, devices, or methods for moving printheads and/or curing lamps to various positions within a printer or similar device could be used. Such provisions may include various kinds of electric motors, or other drive devices known in the art for use in printers.

Some embodiments of the printing device can include provisions that permit color printing. In some embodiments, the printing system may use CMYK printing. In other embodiments, the color printing may be conducted using another suitable printing method.

In those instances where CMYK printing is used, any suitable device, protocol, standard, and method may be used to facilitate the color printing. As used herein, "CMYK" may refer to four pigments used in color printing: "C" for a cyan pigment, "M" for a magenta pigment, "Y" for a yellow pigment, and "K" for a black pigment. An example of a printing device using CMYK printing is disclosed in Miller, U.S. Patent Publication Number 2015-0002567, published on Jan. 1, 2015, titled "Additive Color Printing" (U.S. patent application Ser. No. 13/927,551, filed on Jun. 26, 2013), which application is herein incorporated by reference and referred to hereafter as the "Color Printing" application. In some embodiments, the printing system 100 can include one or more features of the systems, components, devices, and methods disclosed in the Color Printing application to facilitate color printing. For example, printing device 102 may be configured to print an image by dispensing droplets of a print material including one or more pigments onto a base. As used herein, droplets may refer to any suitable volume of print material. For example, a droplet may be one milliliter of print material. In other embodiments, printing system 100 may use other systems, components, devices, and methods.

Figure 3:
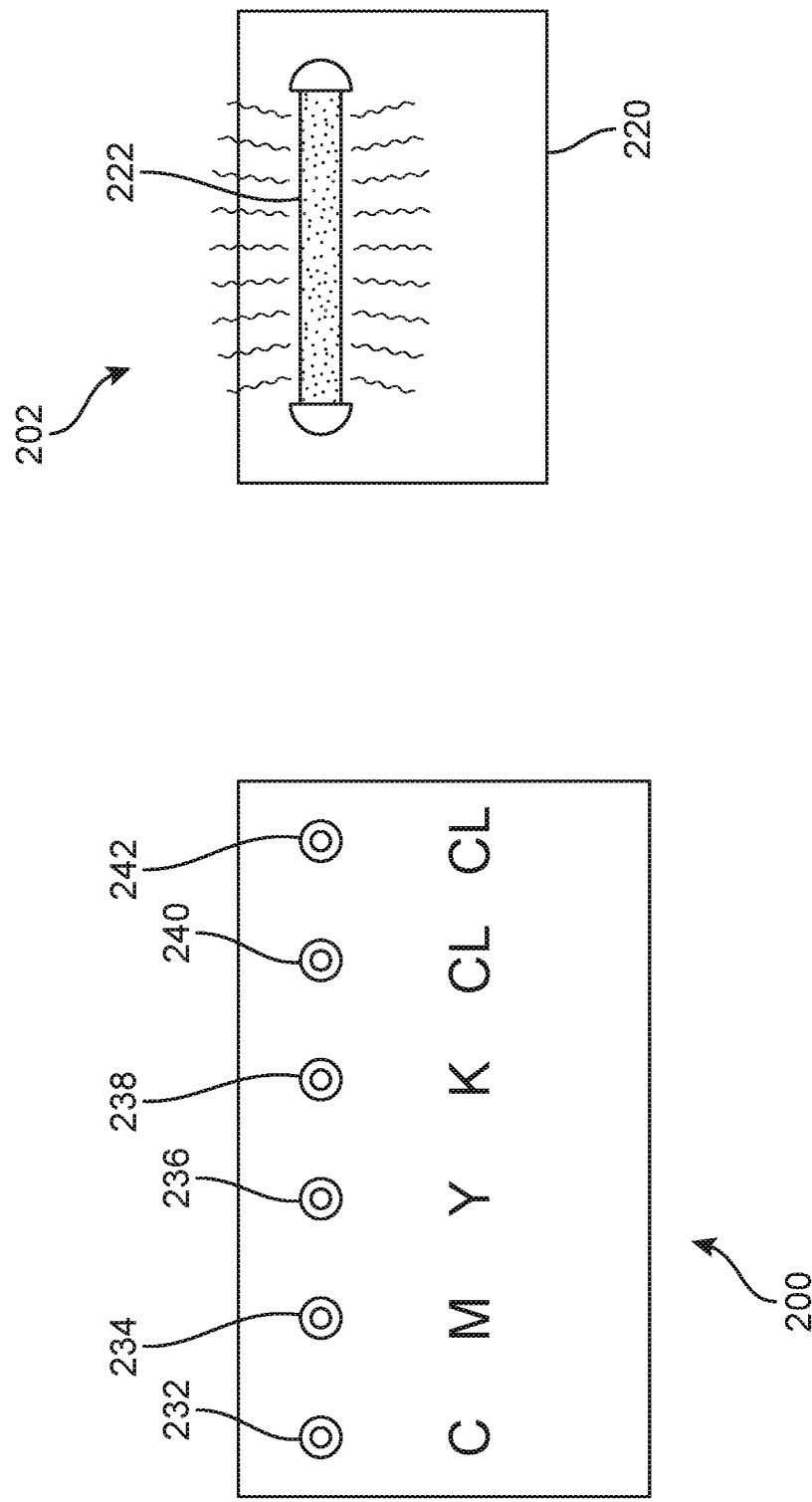
FIG. 3 is a schematic bottom view of an embodiment of a printhead assembly and an adjacent curing device.

In those instances where CMYK printing is used, CMYK may produce or approximate any color in the visible spectrum by printing and intermixing various combinations of pigments. Referring to FIGS. 2 and 3, print head assembly 200 includes separate ink cartridges for cyan (C), magenta (M) and yellow (Y). Thus, the printhead assembly can dispense inks or other colored print materials for the colors cyan (dispensed by nozzle 232), magenta (dispensed by nozzle 234), and yellow (dispensed by nozzle 236). Combinations of the dispensed colored materials may be intermixed to produce one or more colors of red, green, and blue. Further intermixing of colored print materials may be used to produce many more colors beyond red, green, blue, cyan, magenta, and yellow. In the exemplary embodiment, print head assembly 200 may further include a separate cartridge for dispensing black ink or black print material (K), which may be dispensed by nozzle 238. In some embodiments, printing device 102 may include a white cartridge (not shown). While one cartridge for each print material is depicted in FIG. 2, consistent with some embodiments, printing device 102 may include more than one cartridge for one or more of the print materials of print head assembly 200.

In those instances where CMYK printing is used, any suitable print material may be used to facilitate color printing. In some embodiments, CMYK print materials may be water based. In other embodiments, CMYK print materials may be oil based. In some embodiments, CMYK print material may include a structural print material.

Some embodiments may also use a structural print material, whose purpose is to provide 3D structure rather than color. In some embodiments, CMYK print materials may include a clear and/or transparent structure print material. In some embodiments, a CMYK print material may include an opaque structure print material. In some embodiments, the CMYK print material may include a translucent structure print material. In other embodiments, the structural material may have a combination of transparent structural material and/or translucent structural material.

Referring to FIGS. 2 and 3, print head assembly 200 includes two cartridges that dispense a clear structural print material (CL), which are dispensed by nozzle 240 and nozzle 242. Although the exemplary embodiments may use clear structural print materials, other embodiments could include structural print materials with pigments.

Embodiments may include provisions for curing one or more kinds of print materials. Generally, any known methods and/or devices for curing printable substances could be used. Some embodiments may use ultraviolet (UV) curing lamps. As shown in FIGS. 2 and 3, printing system 100 (shown FIG. 1) includes curing device 202. In some embodiments, curing device 202 includes housing 220 and UV emitting source 222 (e.g., a bulb). As discussed in further detail below, curing device 202 may be configured to pass over recently ejected print material (such as inks or structural print materials) to fully or partially cure the print material.

Embodiments using a UV lamp can utilize any type of UV lamp. Exemplary lamps that could be used with the embodiments include, but are not limited to, mercury vapor lamps (including H type, D type, or V type mercury lamps), fluorescent lamps, and/or UV LED devices. The type of lamp used may vary according to the type of print material, the type of printing application, the type of print device used, as well as other manufacturing considerations including cost and availability.

Figure 4:
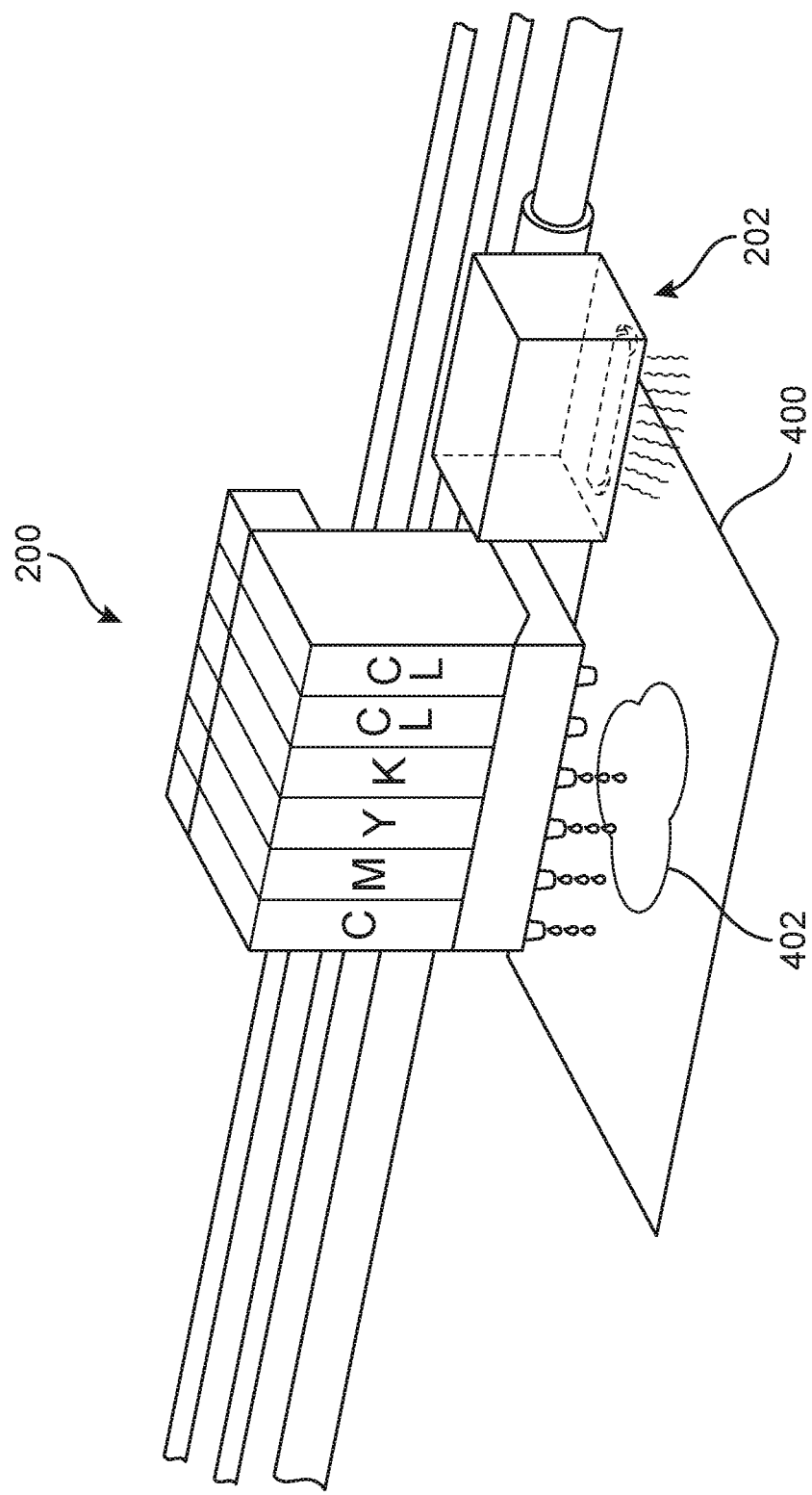
FIG. 4 is a schematic view of an embodiment of a printhead assembly printing to an underlying substrate.
Figure 5:
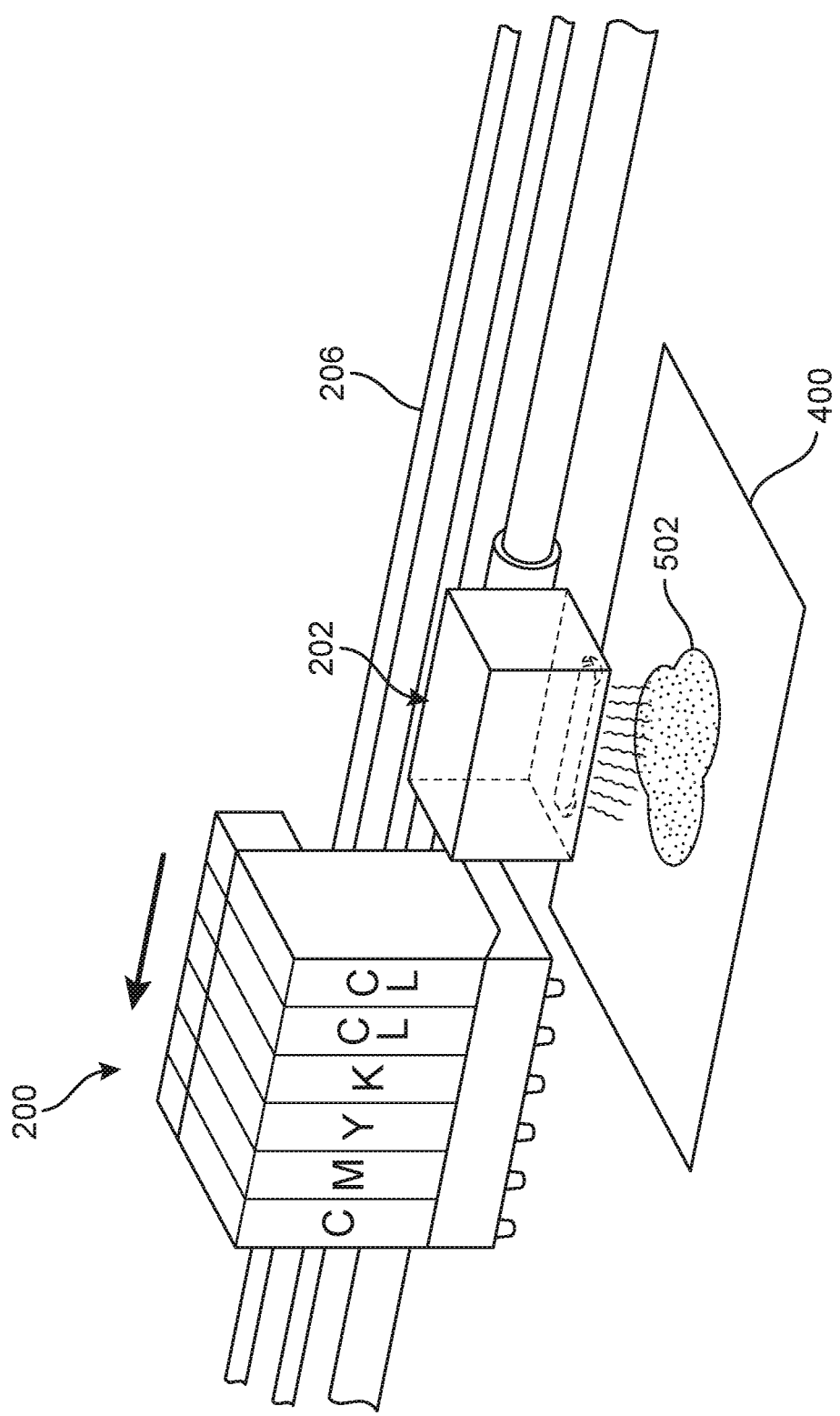
FIG. 5 is a schematic view of an embodiment of a curing device that is curing the print material disposed on an underlying substrate.

FIGS. 4 and 5 are isometric views of some portions of printing device 102 (shown in FIG. 1) in order to illustrate the general operation of print head assembly 200 and curing device 202. As seen in FIG. 4, print material may be printed onto a representative substrate 400. As used herein, the terms "printed," "ejected," "deposited." and "dispensed" may be used interchangeably to describe a process where print material is placed onto a substrate of some kind using a nozzle from a printhead assembly. In this case, printed region 402 is comprised of various kinds of colored print materials released from the CMYK cartridges. In FIG. 5, print head assembly 200 and curing device 202 have been shifted along rails 206 (via an actuating system) so that curing device 202 is disposed directly over the printed region. UV light emitted from curing device 202 may then cure the print material comprising the printed region to yield a printed and cured region 502.

Printed layers e.g., a single layer of ink on a paper) or a printed three-dimensional structure (e.g., a printed object comprised of multiple printed layers) may be seen to have an outermost printed surface or finish. The finish may further have an associated "gloss level" (or "sheen level") that characterizes the visual appearance of the finish with respect to how light reflects off of the surface. For example, a surface with a matte gloss level (or matte finish) may appear dull or "flat" as the light diffuses from the surface at many different angles, while a surface with a glossy gloss level (or glossy finish) may appear shiny as light is reflected along a common (mirror-like) direction. A range of different gloss levels for surfaces are known in the art and an example of such a range includes flat, matte, eggshell, satin, silk, semi-gloss, and high gloss.

In some print materials that are UV cured, one or more curing parameters could affect the type of gloss level achieved in the final printed surface (i.e., the gloss level of a single layer of ink or of the outermost layer of a 3D printed structure). Examples of different curing parameters include, but are not limited to, the time delay between when the print material is dispensed on a surface and when the print material is cured, the intensity of the UV light used for curing, the speed (or velocity) of the curing lamp as it is moved over the print material, the vertical distance between the UV device and the print material surface as well as possibly other factors.

For purposes of clarity, FIGS. 4-5 depict printing of a single layer of print material applied to a substrate. In some cases, the print material could be an ink layer with substantially no thickness or depth. In other cases, the print material could be a structural print material intended to form layers with substantial thickness in order to build up various 3D structures.

FIGS. 6 and 7 illustrate schematic views of a process of printing and curing a print material with printing device 102, in which the relationship of the horizontal spacing between print head assembly 200 and curing device 202 and the time delay between when the print material is dispensed and when the print material is cured is clearly illustrated. For purposes of clarity a single layer of print material is shown in FIGS. 6 and 7, however the concepts discussed herein may also apply in cases where the printed layer is formed on top of multiple previously printed layers. In FIG. 6, print head assembly 200 is disposed over first portion 602 of a single layer of print material 600, while curing device 202 is disposed over an adjacent second portion 604 of the single layer of print material 600. With curing device 202 directly over second portion 604, second portion 604 of print material 600 has been cured (as indicated in FIGS. 6 and 7 using stippling). As seen in FIG. 6, print head assembly 200 is spaced apart from curing device 202 by distance 620 in a horizontal direction (i.e., a rearward edge of print head assembly 200 is spaced apart from a forward edge of curing device 200).

In FIG. 7, print head assembly 200 and curing device 202 have translated in direction 630 along rails 206 so that print head assembly 200 has moved ahead of first portion 602 and curing device 202 is disposed directly over first portion 602. With curing device 202 directly over first portion 602, first portion 602 has now also been cured.

The elapsed time between the different positions of print head assembly 200 and curing device 202 in FIGS. 6 and 7 is indicated schematically using clock 640. Thus, the time delay 622, which is labeled on clock 640 in FIG. 7, occurs between the moment when first portion 602 of print material 600 is deposited onto an underlying substrate 601 and when first portion 602 is cured by curing device 202.

With FIGS. 6-7 in mind, it may be appreciated that in at least some cases, the horizontal spacing between a printhead assembly and a curing device may be in correspondence with the time delay between when print material is ejected from the printhead assembly and when the curing device is located directly over the print material (and thus able to apply the greatest intensity of UV light to the underlying region of print material). Moreover, since the time delay in curing a recently printed substance can affect its resulting gloss level, the gloss level of a print material may be seen to depend on the horizontal spacing between the printhead assembly and the curing device in a configuration such as is used in printing device 102.

Generally, increased delays between when a print material is deposited on a base and when it is cured may increase the gloss level. This is because longer delays in curing time allow more time for the print material (either color inks, clear inks or clear structural print materials) to flow and sheet, which results in a glossier finish.

Figure 8:
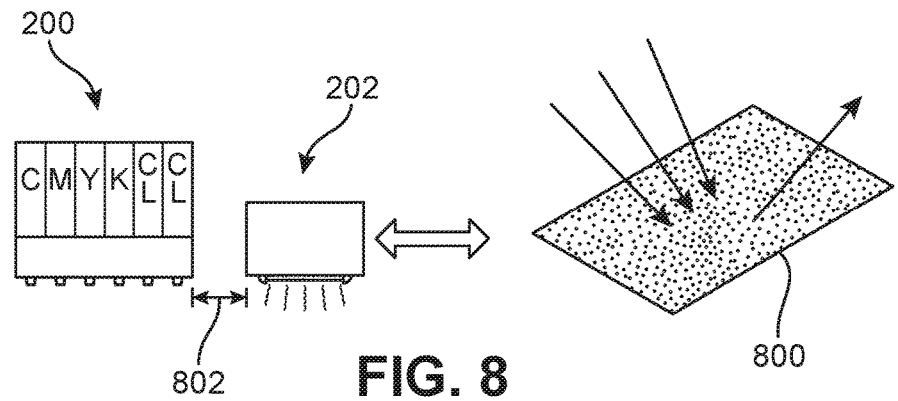
FIGS. 8-10 are schematic views of a printhead assembly and a curing device and corresponding gloss levels for a printed surface, intended to illustrate how the gloss level changes with the separation distance between the printhead assembly and the curing device, according to an embodiment.
Figure 9:
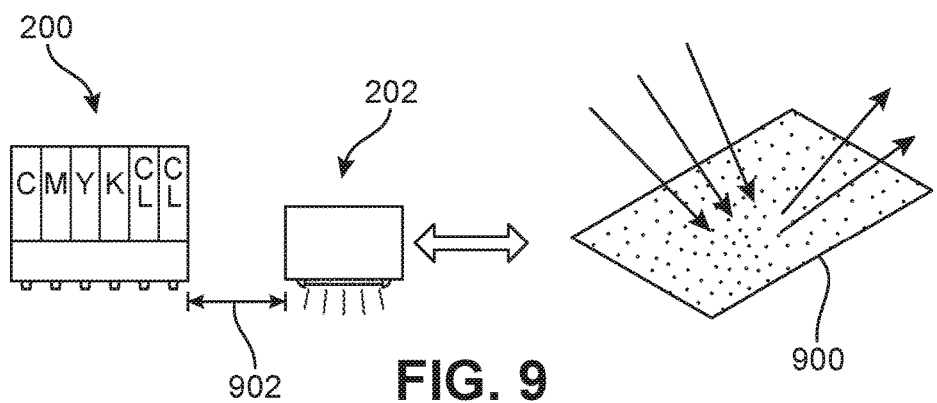
Figure 10:
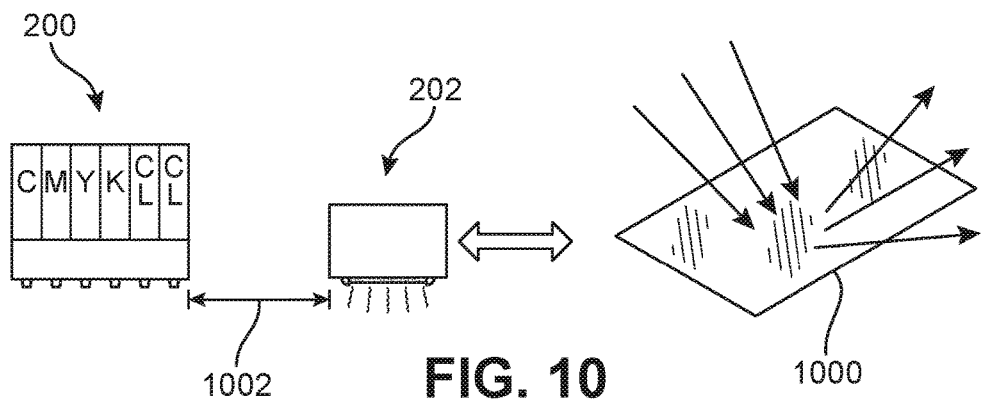

FIGS. 8-10 illustrate schematic views of different separation distances (between a printhead assembly and a curing device) and the gloss level produced by that separation distance. Of course, it may be appreciated that the gloss level of a printed surface could vary according to various other parameters, but for purposes of clarity it may be assumed that only the separation distance is changed from one configuration to the next. In the configuration shown in FIG. 8, print head assembly 200 and curing device 202 are spaced apart by first separation distance 802, which results in a matte gloss level for the surface of printable feature 800. In the configuration shown in FIG. 9, print head assembly 200 and curing device 202 are spaced apart by second separation distance 902, which results in a satin gloss level for the surface of printable feature 900. It may be seen by comparing FIGS. 8 and 9 that second separation distance 902 is greater than first separation distance 802, thereby resulting in the higher gloss for printable feature 900 as compared to printable feature 800. In the configuration shown in FIG. 10, print head assembly 200 and curing device 202 are spaced apart by third separation distance 1002, which results in a high gloss level for the surface of printable feature 1000. It may be seen by comparing FIGS. 9 and 10 that third separation distance 1002 is greater than second separation distance 902, thereby resulting in the higher gloss for printable feature 1000 as compared to printable feature 900. The progression of FIGS. 8-10 clearly demonstrate that in at least some embodiments, the gloss level of a cured print surface (i.e., the surface of a printable feature after curing) progresses from less glossy for relatively smaller separation distances to more glossy for relatively larger separation distances.

The exemplary separation distances discussed in FIGS. 8-10 are only intended to show the relative effect of increasing separation distances, and thus in these embodiments, the absolute values of the separation distances are not considered. It may be appreciated that the particular values of one or more separation distances may vary according to a variety of factors including the type of print material, the printhead and curing device velocity, the type of curing device used, as well as possibly other factors. Moreover, the embodiments depict three particular separation distances corresponding to three distinct gloss levels; however, it may be appreciated that other embodiments could vary the separation distance continually to produce a continuous range of gloss levels.

Embodiments may be configured to dynamically adjust the spacing between a printhead assembly and a curing device. That is, in some embodiments of a print device, the spacing between a printhead assembly and a curing device can be automatically adjusted (e.g., by a print controller sending instructions to the actuating systems controlling the motions/positions of these components along the rails or tracks). Such provisions may allow for printed structures with different gloss levels to be formed without requiring separate printing runs and/or stopping the printer to make manual adjustments.

Figure 11:
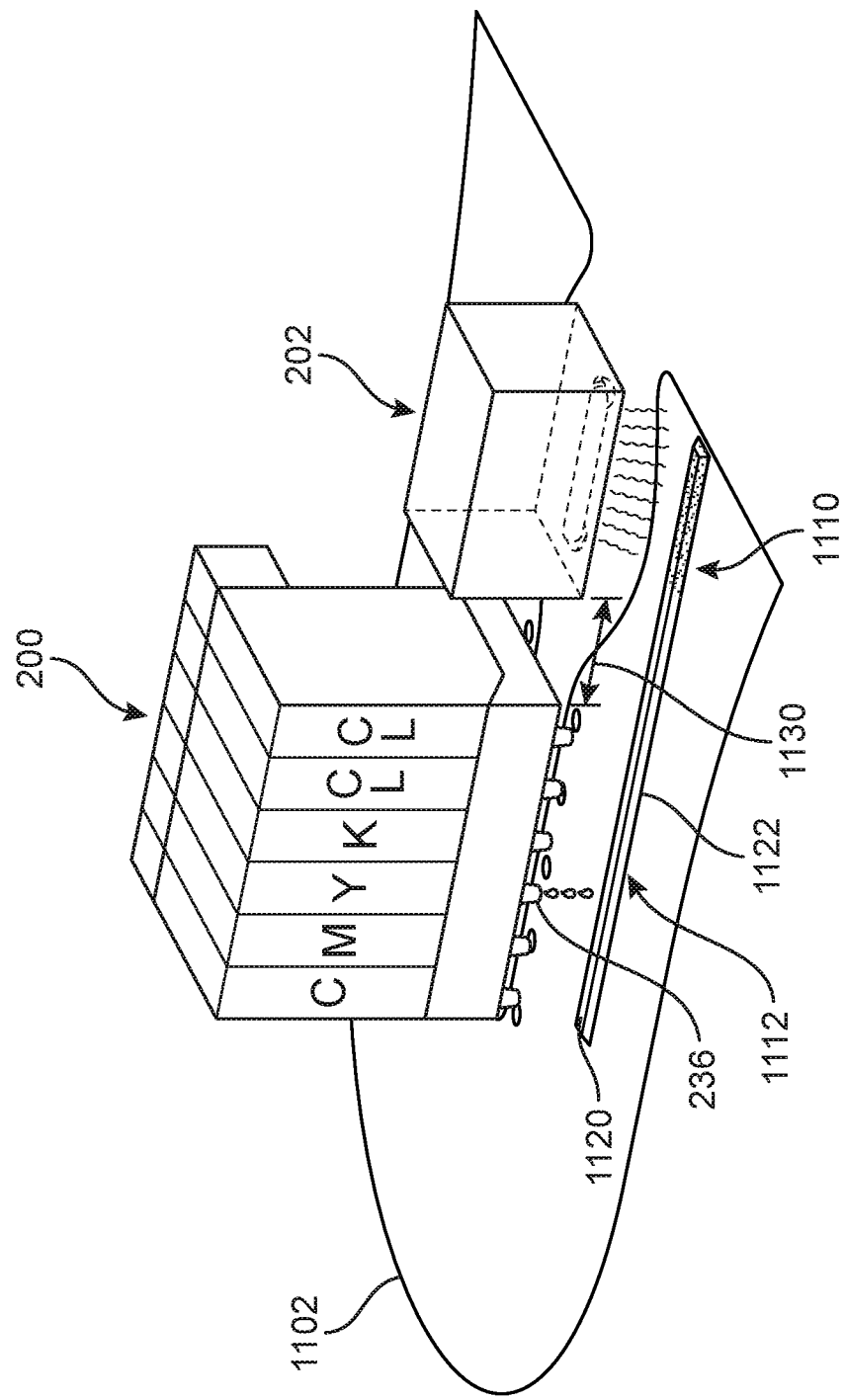
FIGS. 11-12 are isometric schematics views of a printhead assembly printing to a substrate and a curing device curing printed material on the substrate when the printhead assembly and curing device are separated by a first separation distance, according to an embodiment.
Figure 12:
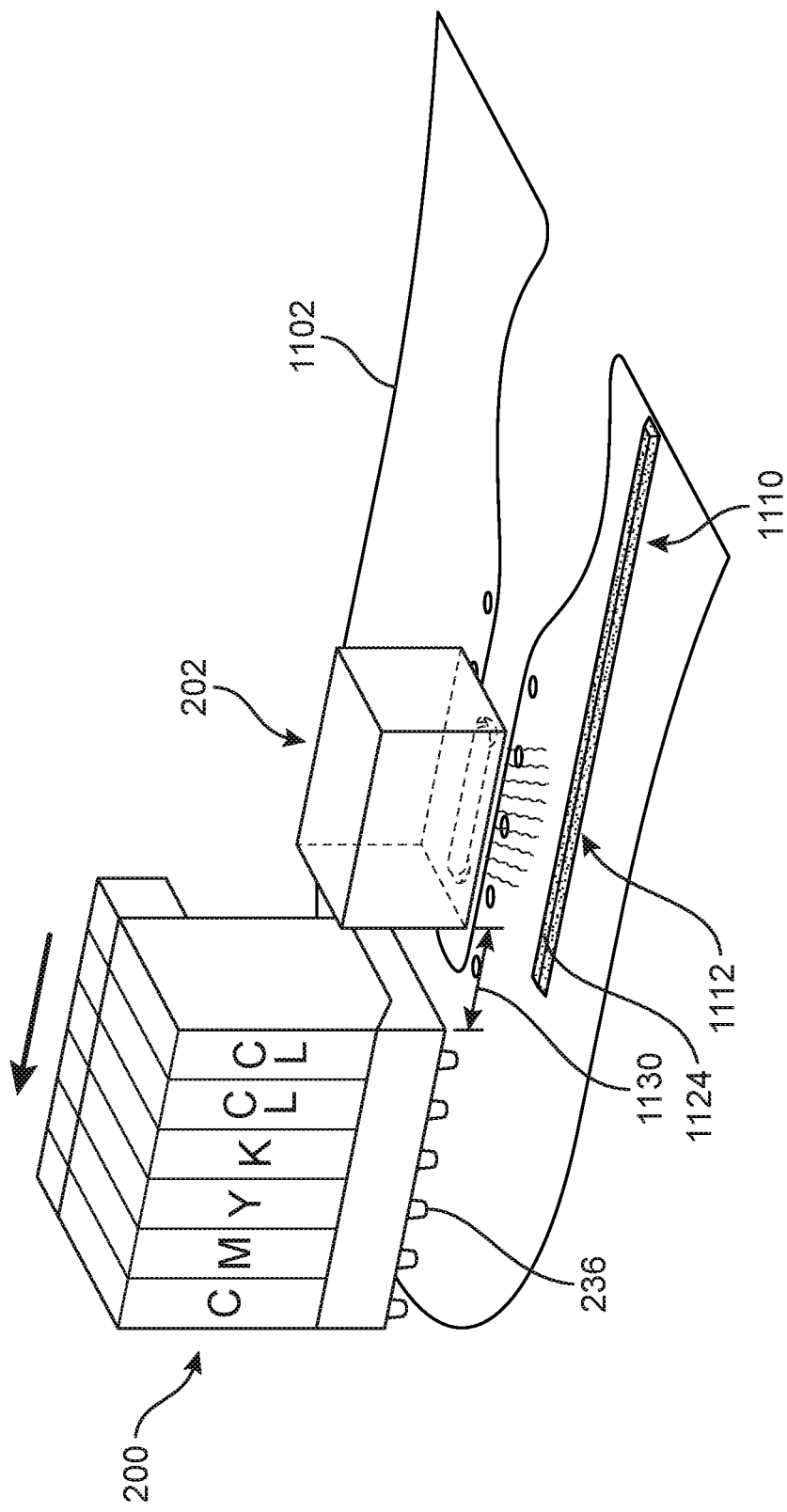

FIGS. 11 and 12 illustrate schematic views of print head assembly 200 and curing device 202 passing over regions of a base layer of upper 1102 (e.g., a printing substrate). As seen in FIGS. 11-12, print head assembly 200 and curing device 202 form raised strip 1110 on the surface of upper 1102. Specifically, as seen in FIG. 11, print head assembly 200 is initially positioned over portion 1112 of raised strip 1110 and dispenses a final layer of print material from nozzle 236 (comprising a print material with a yellow pigment) to form an uncured surface 1120 of portion 1112. In some cases where print material from nozzle 236 is an ink, the print material may form a colored outer layer for a 3D printed structure.

Next, in the configuration shown in FIG. 12, print head assembly 200 and curing device 202 have advanced along upper 1102 while maintaining a constant separation distance 1130. With curing device 202 directly over portion 1112, cured surface 1124 for portion 1112 is formed. In this case, the separation distance is selected to achieve a matte gloss level (or matte finish) for portion 1112, which matches the gloss level of the previously printed and cured portions of raised strip 1110.

Figure 13:
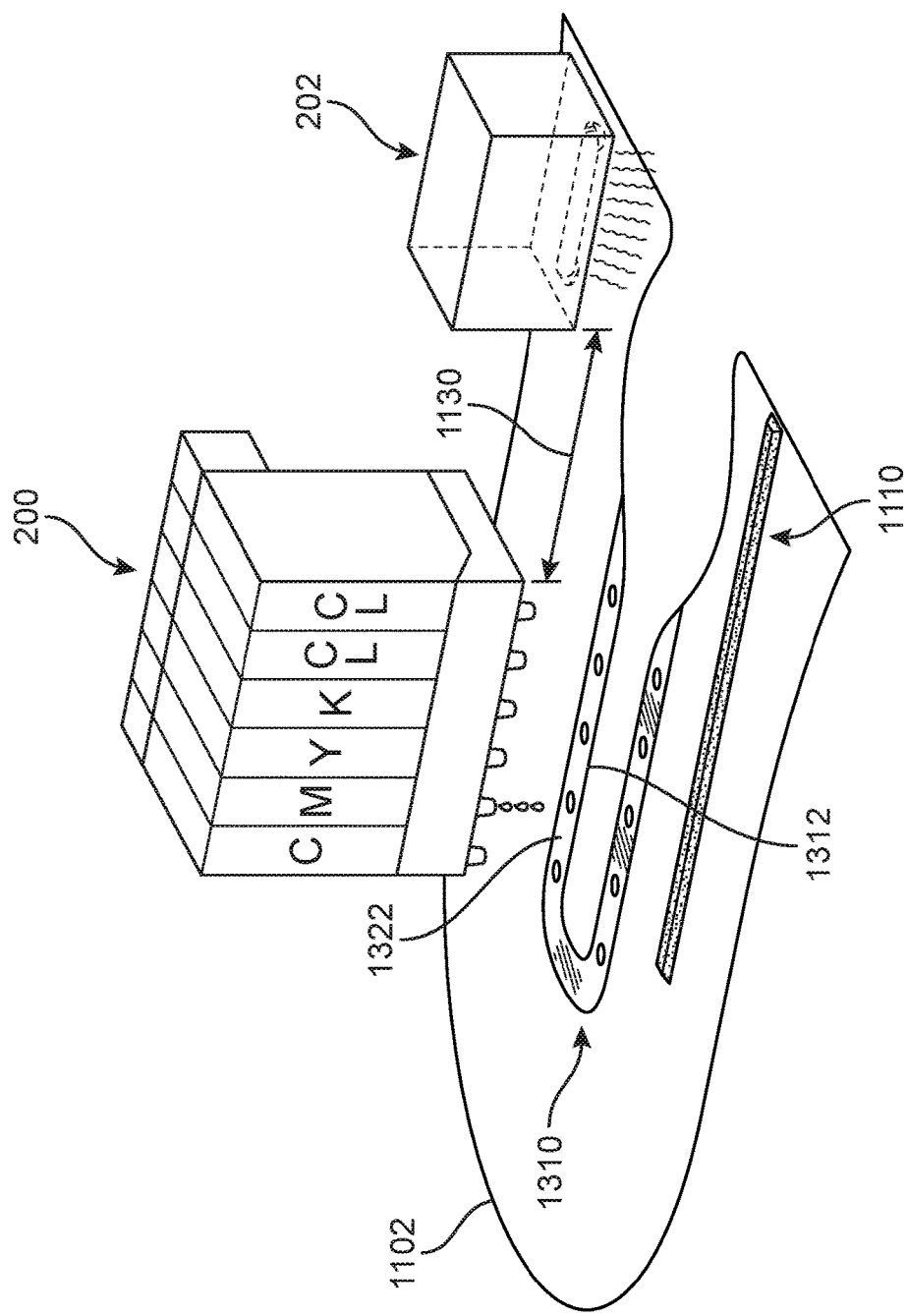
FIGS. 13-14 are isometric schematic views of the printhead assembly and curing device of FIGS. 11-12, in which print material is dispensed and cured while the printhead assembly and the curing device are separated by a second separation distance that is greater than the first separation distance.
Figure 14:
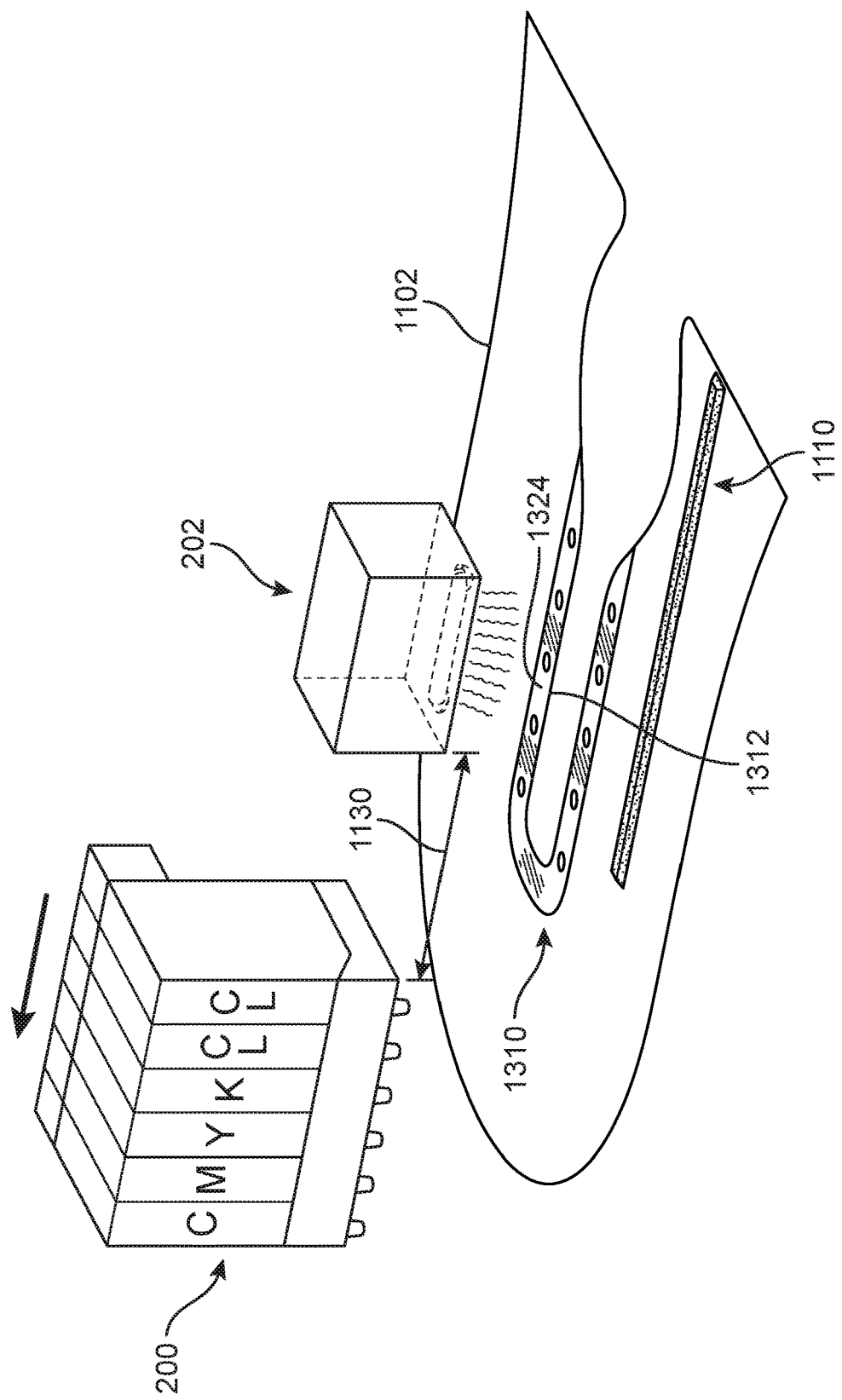

In FIGS. 13-14, printing system 100 has dynamically adjusted the separation distance between print head assembly 200 and curing device 202 prior to forming eyestay structure 1310 on upper 1102. This dynamic adjustment may be achieved in different ways, including using separate actuators for the printhead assembly and the curing device, as discussed in further detail below. In FIG. 13, portion 1312 of eyestay structure 1310 is formed with uncured surface 1322. In FIG. 14, because of the increased separation distance 1130 between print head assembly 200 and curing device 202 (relative to separation distance 1130 discussed above and shown in FIGS. 11-12) portion 1312 has cured surface 1324 with a gloss level that is high gloss once curing device 202 cures portion 1312.

Figure 15:
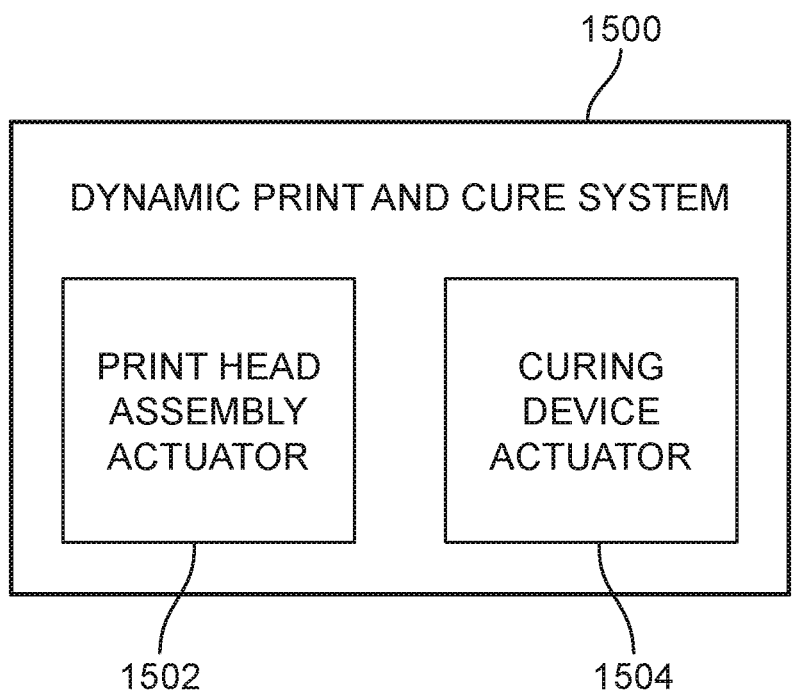
FIG. 15 is a schematic view of an embodiment of a dynamic print and cure system.

FIG. 15 illustrates a schematic view of an embodiment of a dynamic print and cure system 1500, which may be considered as a subsystem of printing system 100 (see FIG. 1). Dynamic print and cure system 1500 may be any collection of components, devices, and/or systems that are used to control the printhead assembly and the curing device such that the separation distance between these two components (along their direction(s) of motion) can be varied. In the embodiment of FIG. 15, the dynamic print and cure system 1500 includes at least two separate actuators, namely print head assembly actuator 1502 and curing device actuator 1504. Each actuator may, thus, independently control the motion of its corresponding component along a rail or track of printing device 102 (see FIG. 1). As previously discussed, these actuators could comprise any known actuating devices used for moving printheads or other components of print systems. Alternatively, in some other embodiments, a system may utilize a first actuating system that moves both the printhead assembly and the curing device at the same time, and a second actuating system that positions the curing device relative to the printhead assembly. In such a configuration, the second actuating system cannot independently move the printhead assembly, but may only move the curing device relative to the printhead assembly. Thus, the first actuating system might be attached to a carrier where the printhead assembly and the curing device are mounted, while the second actuating system might be used to change the position of the curing device within the carrier (and relative to the printhead assembly).

In order to control the positions and motions of each distinct device or assembly, dynamic print and cure system 1500 may further comprise computational modules (e.g., independent circuits or modules within software running on a computing system) that determine the desired or target separation distance between a printhead assembly and a curing device so that the desired or target gloss level for a printed surface is achieved.

Figure 16:
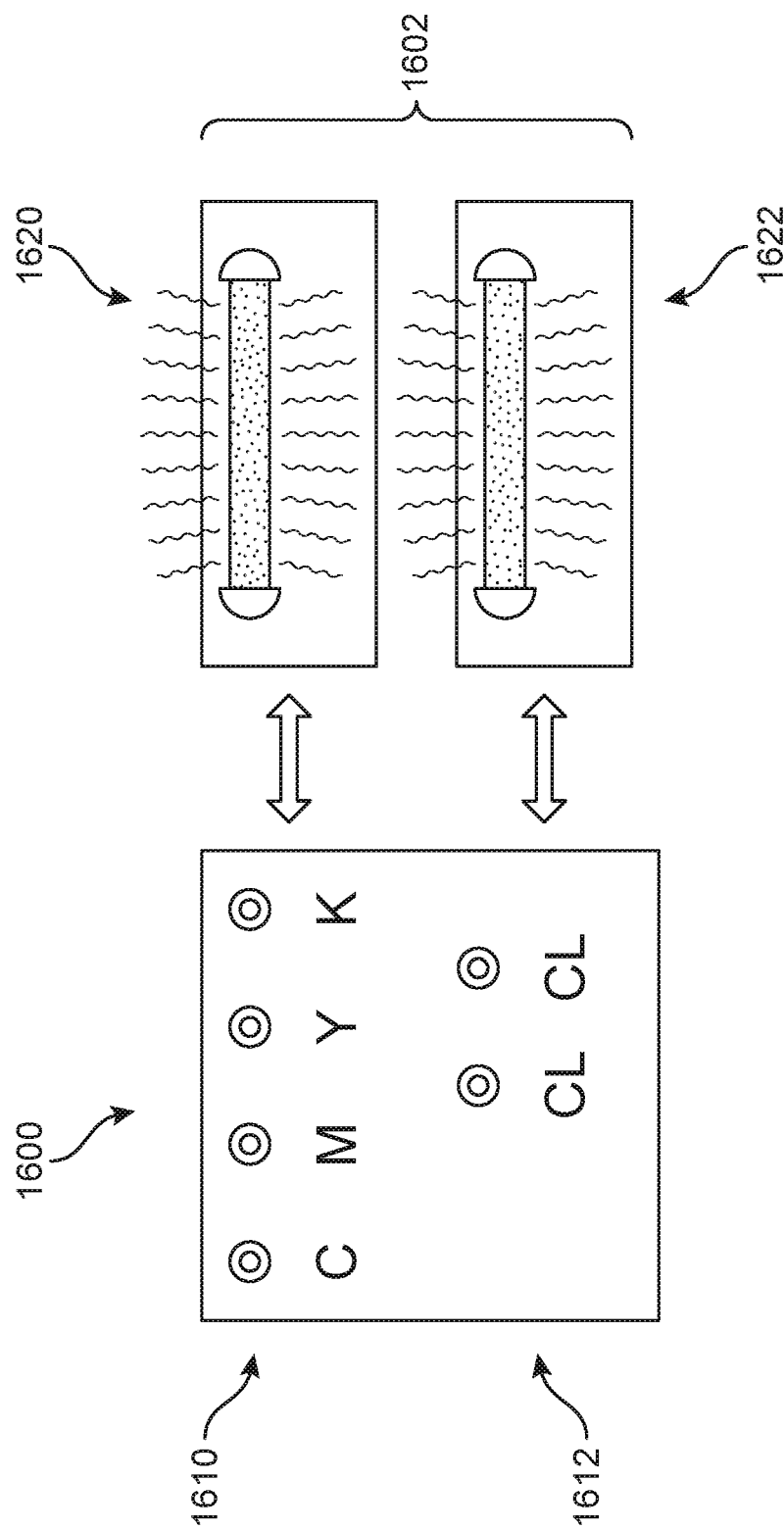
FIG. 16 is a schematic bottom view of an embodiment of a compact printhead assembly with colored nozzles in a first row and clear structural print nozzles in a second row, as well as two separate curing devices for curing print material deposited by each row.

FIG. 16 illustrates a schematic plan view of print head assembly 1600 and set of curing devices 1602 for use in another embodiment of a printing system. As seen in FIG. 16, print head assembly 1600 has a compact design, in which nozzles dispensing colored print material are aligned in first row 1610 and nozzles dispensing clear (or otherwise colored) structural print material are aligned in second row 1612. Additionally, set of curing devices 1602 comprises first curing device 1620 and second curing device 1622. First curing device 1620 may be aligned (along a direction of motion or translation) with first row 1610 of print nozzles, and second curing device 1622 may be aligned with second row 1612 of print nozzles. Further details regarding this compact or multi-row print nozzle configuration for a printhead assembly is discussed in Miller, U.S. patent application Ser. No. 15/287,529, filed on Oct. 6, 2016, (previously U.S. Provisional Application No. 62/248,559), titled "Adjustable Gloss Level for Compact Printhead Arrangement", the entirety of which is herein incorporated by reference. It may be understood that the printhead assembly details are similar to previous embodiments except with respect to the positions and arrangements of print cartridges and/or nozzles within the printhead assembly. Likewise, the curing devices may be similar to one another and/or to the curing devices discussed previously in the earlier embodiments (e.g., curing device 202).

As with the previous embodiments, the embodiment of FIG. 16 may include provisions for dynamically adjusting the separation distance between first curing device 1620 and first row 1610 of print nozzles and between second curing device 1622 and second row 1612 of print nozzles. This arrangement allows for independent control of the gloss level for surfaces printed with colored print materials and for surfaces printed with clear print materials, including clear structural print materials. Moreover, the dynamic adjustments of these separation distances may allow for printing flat or three-dimensional structures having a variety of different gloss levels for different types of print materials in a single run, without requiring manual adjustments during a print job.

Figure 17:
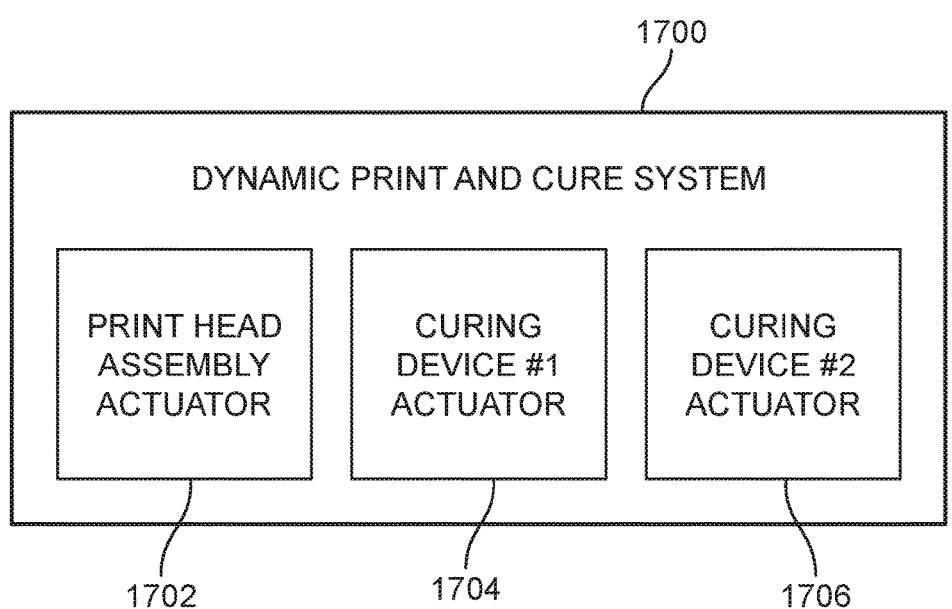
FIG. 17 is a schematic view of an embodiment of a dynamic print and cure system for use with two curing devices.

FIG. 17 illustrates a schematic view of an embodiment of a dynamic print and cure system 1700, which may be considered as a subsystem of a printing system for print head assembly 1600 and set of curing devices 1602 shown in FIG. 16. Dynamic print and cure system 1700 may be any collection of components, devices, and/or systems that are used to control the printhead assembly and the curing devices such that the separation distance between these components (along their direction(s) of motion) can be varied. In the embodiment of FIG. 17, the dynamic print and cure system 1700 includes at least three separate actuators, namely print head assembly actuator 1702, first curing device actuator 1704 (for controlling the motion and position of first curing device 1620) and second curing device actuator 1706 (for controlling the motion and position of second curing device 1622). Each actuator may, thus, independently control the motion of its corresponding component along a rail or track of a printing device. As previously discussed, these actuators could comprise any known actuating devices used for moving printheads or other components of print systems.

In order to control the positions and motions of each distinct device or assembly, dynamic print and cure system 1700 may further comprise computational modules (e.g., independent circuits or modules within software running on a computing system) that determine the desired or target separation distance between a printhead assembly and each of the two curing lamps so that the desired or target gloss level for a printed surface formed with a particular type of print material is achieved.

Figure 18:
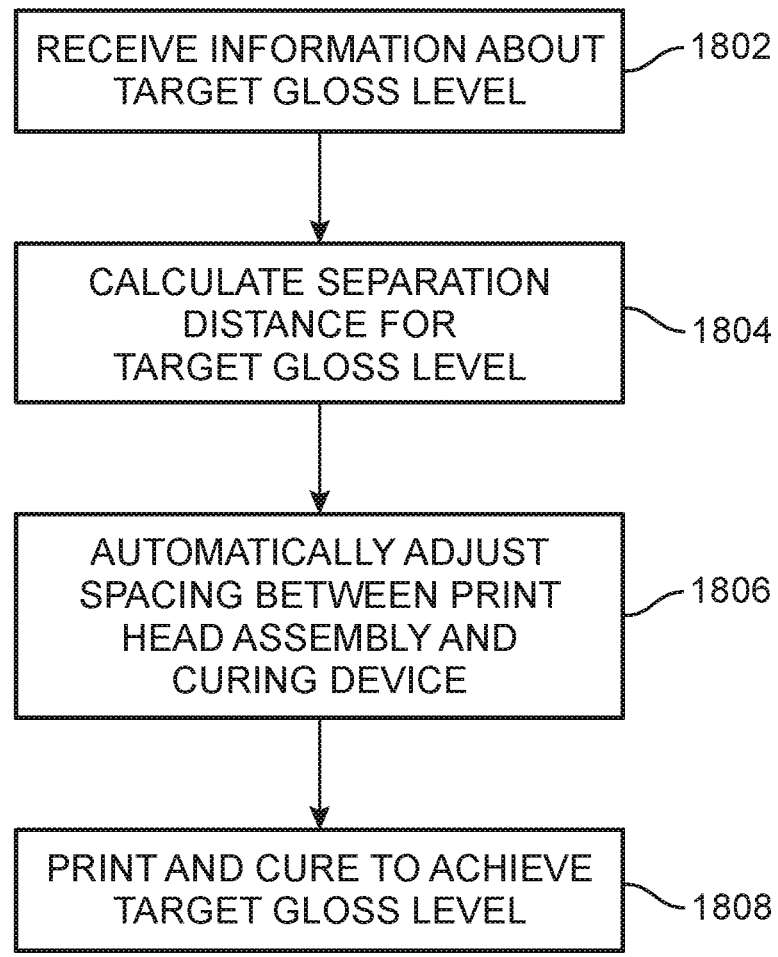
FIG. 18 is a schematic view of a process for printing and curing a portion of a structure with a target gloss level, according to an embodiment.

FIG. 18 illustrates a schematic view of an embodiment of a process for printing and curing a portion of a 2D or 3D structure. It may be appreciated that in some embodiments, one or more steps may be optional, while in other embodiments the process could include additional steps. The method, therefore, may not be limited to the particular steps or order of steps discussed here.

In step 1802, a printing system (including a print device or any other component of the printing system) may receive information about a target gloss level, which is the desired gloss level for a portion of the structure or element to be printed. This may be received as part of a print file, or as a separately transmitted parameter and may be sent by a print controller, computing system, or other device. Next, in step 1804, a printing device may calculate a separation distance between a printhead assembly and a curing device for the target gloss level. This calculation can include a variety of different input parameters, such as the velocity of the printhead assembly and curing device, the curing energy, the material viscosity as well as possibly other parameters.

Next, in step 1806, the printing system may automatically adjust the spacing between the printhead assembly and the curing device. Finally, in step 1808 the printing system prints a portion of the resulting printed structure and cures that portion so as to achieve the target gloss level for that portion of the structure.

Figure 19:
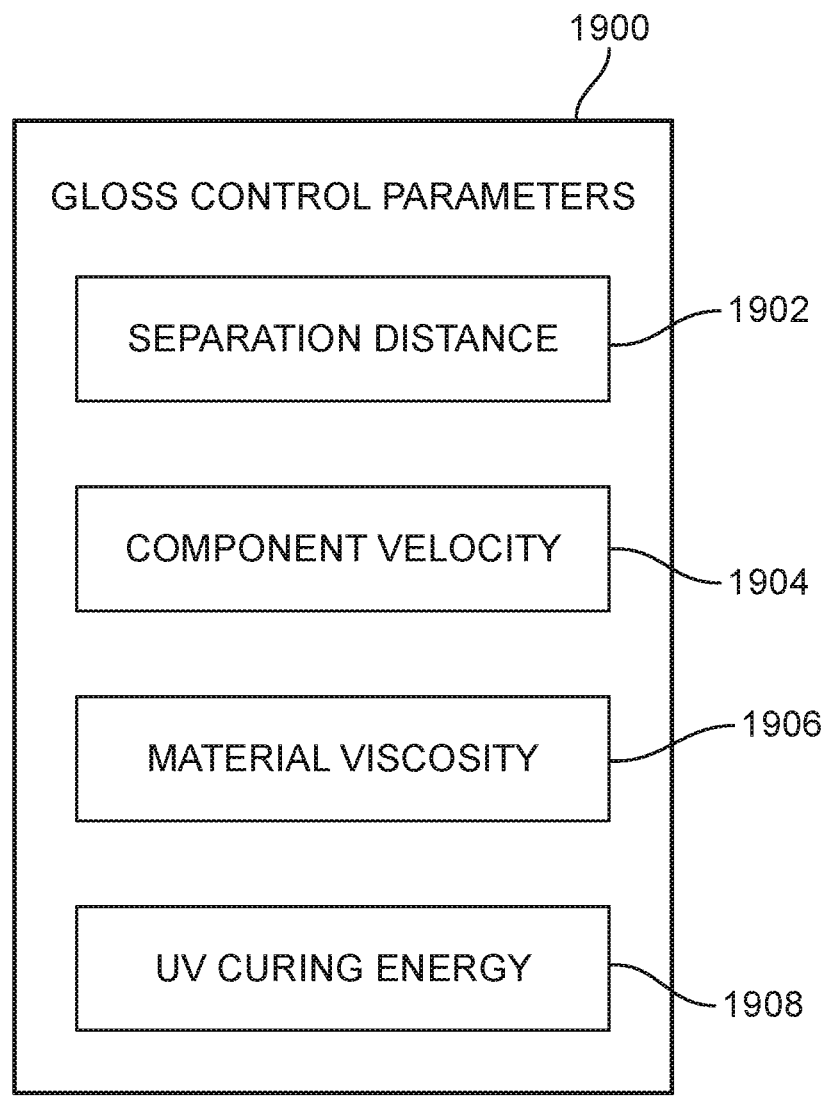
FIG. 19 is a schematic view of a set of gloss level control parameters, according to an embodiment.

In some embodiments, the separation distance is varied to achieve different gloss levels for printed regions of a structure. However, it is contemplated that in other embodiments other parameters of a system could be varied to modify the gloss level. FIG. 19 illustrates a schematic view of some possible gloss control parameters. Some of these may be seen as inputs to calculating the separation distance in certain operating modes of the system, while in other operating modes these may be independently adjustable parameters. These parameters include separation distance 1902, component velocity 1904 (e.g., the velocity of a printhead assembly and/or of a curing device), material viscosity 1906 (i.e., of one or more print materials), and UV curing energy 1908. In some embodiments, some of these parameters can be independently adjustable, while in other embodiments some parameters are not adjustable and/or may not be independently adjustable.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A method of printing a printable feature onto a substrate, the method comprising:

receiving the substrate at a printing device, the printing device comprising a printhead assembly, a first curing device, and a second curing device, the first and second curing devices being on opposing sides of the printhead assembly;

initiating a print job;

receiving a first gloss level information at the printing device, the first gloss level information indicating a first target gloss level for a first predetermined surface portion of the printable feature;

calculating a first separation distance between the printhead assembly and the first curing device based on the first target gloss level for the printable feature;

calculating a second separation distance between the printhead assembly and the second curing device based on the first target gloss level for the printable feature;

adjusting a first spacing between the printhead assembly and the first curing device so that the printhead assembly is spaced from the curing device by the first separation distance;

adjusting a second spacing between the printhead assembly and the second curing device so that the printhead assembly is spaced from the second curing device by the second separation distance;

moving the printhead assembly, the first curing device, and the second curing device along an upper surface of a base;

printing a print material onto the substrate using the printhead assembly and curing the print material using the first and second curing devices so that the print material forms the first predetermined surface portion of the printable feature having the first target gloss level;

receiving a second gloss level information at the printing device, the second gloss level information indicating a second target gloss level for a second predetermined surface portion of the printable feature;

automatically adjusting the first and second spacing dynamically during the print job, while the printhead assembly and the first and second curing devices are in motion, based on the second target gloss level; and printing the print material onto the substrate using the printhead assembly and curing the print material using the first and second curing devices so that the print material forms the second predetermined surface portion of the printable feature having the second target gloss level.

2. The method of printing as in claim 1, wherein the printable feature is a layer of ink.

3. The method of printing as in claim 1, wherein the printable feature is a three-dimensional structural component.

4. The method of printing according to claim 3, wherein the printhead assembly includes a single row of nozzles including at least one nozzle configured to dispense the print material with a colored pigment and at least one nozzle configured to dispose a clear structural print material.

5. The method of printing as in claim 1, wherein the first and second curing devices are UV curing lamps.

6. The method of printing as in claim 1, wherein the first and second target gloss levels are changed by varying a time delay between when the print material is dispensed by a nozzle and when the first and second curing devices are disposed directly over the print material.

7. The method of printing as in claim 1, wherein the method includes forming another predetermined surface portion of the printable feature with another target gloss level that is different from the first and second target gloss levels.

8. The method of printing according to claim 7, wherein the another target gloss level can be achieved by adjusting the first spacing and the second spacing between the printhead assembly and the first and second curing devices, respectively, to be different than the first and second separation distances, respectively, of the first target gloss level and the second target gloss level.

9. The method of printing according to claim 7, wherein the another target gloss level can be achieved by adjusting a velocity of the printhead assembly and the first and second curing devices.

10. The method of printing according to claim 7, wherein the another target gloss level can be achieved by adjusting a curing energy of the first curing device and/or the second curing device.

11. The method of printing according to claim 1, wherein the adjusting of the first spacing is controlled by a first curing device actuator and the adjusting of the second spacing is controlled by a second curing device actuator.

12. The method of claim 11, wherein the first and second curing device actuators operate independently.

13. The method of printing according to claim 1, wherein the step of moving the printhead assembly and the curing device comprises maintaining the first and second separation distances between the printhead assembly and the curing device while the first predetermined surface portion is formed.

14. The method of printing according to claim 1, wherein at least one of the first and second separation distances are varied continuously to produce a continuous range of gloss levels between the first target gloss level and the second target gloss level.

* * * * *